(12) United States Patent
Li

(10) Patent No.: US 12,130,742 B1
(45) Date of Patent: Oct. 29, 2024

(54) REQUEST PROCESSING METHOD AND APPARATUS, AND DEVICE AND NON-TRANSITORY READABLE STORAGE MEDIUM

(71) Applicant: ZHENGZHOU YUNHAI INFORMATION TECHNOLOGIES CO., LTD., Zhengzhou (CN)

(72) Inventor: Hongwei Li, Zhengzhou (CN)

(73) Assignee: ZHENGZHOU YUNHAI INFORMATION TECHNOLOGIES CO., LTD., Henan (CN)

( * ) Notice: Subject to any disclaimer, the term of this patent is extended or adjusted under 35 U.S.C. 154(b) by 0 days.

(21) Appl. No.: 18/695,815

(22) PCT Filed: Sep. 28, 2022

(86) PCT No.: PCT/CN2022/122296
§ 371 (c)(1),
(2) Date: Mar. 26, 2024

(87) PCT Pub. No.: WO2023/116109
PCT Pub. Date: Jun. 29, 2023

(30) Foreign Application Priority Data

Dec. 23, 2021 (CN) .......................... 202111621376.0

(51) Int. Cl.
*G06F 12/0871* (2016.01)
*G06F 12/0891* (2016.01)
(52) U.S. Cl.
CPC ...... *G06F 12/0871* (2013.01); *G06F 12/0891* (2013.01)

(58) Field of Classification Search
None
See application file for complete search history.

(56) References Cited

U.S. PATENT DOCUMENTS

| | | | |
|---|---|---|---|
| 8,806,154 B1* | 8/2014 | Gupta | G06F 3/0644 711/170 |
| 2017/0060898 A1* | 3/2017 | Lu | G06F 3/0689 |
| 2022/0188267 A1* | 6/2022 | Patil | G06F 16/185 |
| 2022/0261386 A1* | 8/2022 | Negi | G06F 16/2343 |

FOREIGN PATENT DOCUMENTS

| CN | 101840362 A | 9/2010 |
|---|---|---|
| CN | 103729301 A | 4/2014 |
| CN | 111125447 A | 5/2020 |
| CN | 112130760 A | 12/2020 |
| CN | 114327270 A | 4/2022 |

* cited by examiner

*Primary Examiner* — Charles Rones
*Assistant Examiner* — Ryan Dare
(74) *Attorney, Agent, or Firm* — IPro, PLLC

(57) ABSTRACT

A request processing method and apparatus, a device, and a non-transitory readable storage medium. When modifying reflink data, in the present application, first reading continuous data including currently modified data from a disk to a cache, then modifying corresponding reflink data in the cache, but not modifying other data in the continuous data, and then allocating a new address for the modified new reflink data in the disk, and mapping the cache address of the new reflink data to the new address, so as to store the new reflink data in the new address, and at the same time reducing the reference count of the corresponding reflink data in the reflink shared tree by one. In this solution, there is only one read operation and one write operation for the disk, so the problem of write amplification is reduced.

20 Claims, 2 Drawing Sheets

REQUEST PROCESSING METHOD AND APPARATUS, AND DEVICE AND NON-TRANSITORY READABLE STORAGE MEDIUM

CROSS-REFERENCE TO RELATED APPLICATION

The present application claims the priority of the Chinese patent application filed on Dec. 23, 2021 before the CNIPA, China National Intellectual Property Administration with the application number of 202111621376.0 and the title of "REQUEST PROCESSING METHOD AND APPARATUS, AND DEVICE AND NON-TRANSITORY READABLE STORAGE MEDIUM", which is incorporated herein in its entirety by reference.

FIELD

The present application relates to the technical field of computers, and in particular to a request processing method and apparatus, a device and a non-transitory readable storage medium.

BACKGROUND

In cloud computing and virtualization scenarios, reflink can be used as the underlying technology of data backup solution, and can also be used to implement snapshot and continuous data protection, which is a widely used data backup technology. The reflink is a lightweight data copying method based on CoW (copy-on-write) principle provided by a file system, and a new file and a source file sharing data area obtained by reflink copying.

The reflink can improve disk space utilization and copy speed, but it also has some limitations. Specifically, since reflink is implemented based on the CoW principle, there is a write amplification problem when data shared by reflink is modified. For example: when modifying data A, it is necessary to first read A from a disk to a cache, then copy A in the cache to a new location in the disk, and then modify A in the cache, and then store the modified A in the new location again. It can be seen that this process has one read operation and two write operations, and has a write amplification problem.

SUMMARY

In view of the above, it is an object of the present application to provide a request processing method and apparatus, a device and a non-transitory readable storage medium to reduce the write amplification problem when reflink data is modified. The solution is as follows.

In a first aspect, the present application provides a request processing method, including:
  receiving a modification request of reflink data;
  reading continuous data including the reflink data from a disk to a cache, and modifying the reflink data in the cache according to the modification request to obtain new reflink data; and
  allocating a new address for the new reflink data in the disk, and mapping a cache address of the new reflink data to the new address, so as to store the new reflink data to the new address according to a file open mode of the modification request, and reducing a reference count of the reflink data in a reflink shared tree by one.

In some embodiments of the present application, reading continuous data including the reflink data from a disk to a cache includes:
  reading continuous data including the reflink data from the disk to the cache on the basis of locality principles.

In some embodiments of the present application, store the new reflink data to the new address according to a file open mode of the modification request includes:
  determining the file open mode according to a mode flag bit in the modification request;
  when the file open mode is a direct mode, returning a notification message that processing is completed after storing the new reflink data to the new address.

In some embodiments of the present application, store the new reflink data to the new address according to a file open mode of the modification request includes:
  determining the file open mode according to a mode flag bit in the modification request;
  when the file open mode is a non-direct mode, returning a notification message that processing is completed, and marking the new reflink data as dirty data, so as to store the new reflink data to the new address according to a preset flush mechanism.

In some embodiments of the present application, the preset flush mechanism includes: a periodicity mechanism, a memory reclamation mechanism, and/or a user enforcement mechanism.

In some embodiments of the present application, after reducing a reference count of the reflink data in a reflink shared tree by one, the request processing method further includes:
  when the reference count after reducing by one is equal to one, deleting a node where the reflink data is located from the reflink shared tree.

In some embodiments of the present application, further including:
  when an access request for other data in the continuous data is received, responding to the access request based on the other data in the cache.

In some embodiments of the present application, mapping a cache address of the new reflink data to the new address includes:
  invoking a cache interface to release a mapping relationship between the cache address and an original address of the reflink data in the disk, and establishing a mapping relationship between the cache address and the new address.

In a second aspect, the present application provides a request processing apparatus, including:
  a receiving module, for receiving a modification request of reflink data;
  a modification module, for reading continuous data including the reflink data from a disk to a cache, and modifying the reflink data in the cache according to the modification request to obtain new reflink data; and
  a storage module, for allocating a new address for the new reflink data in the disk, and mapping a cache address of the new reflink data to the new address, so as to store the new reflink data to the new address according to a file open mode of the modification request, and reducing a reference count of the reflink data in a reflink shared tree by one.

In a third aspect, the present application provides an electronic device, including:
  a storage, for storing a computer program;
  a processor, for executing the computer program to implement the request processing method disclosed above.

In a fourth aspect, the present application provides a non-transitory readable storage medium, for storing a computer program, wherein the computer program, when executed by a processor, implements the request processing method disclosed above.

It can be seen from the above solutions that, the present application provides a request processing method, including: receiving a modification request of reflink data; reading continuous data including the reflink data from a disk to a cache, and modifying the reflink data in the cache according to the modification request to obtain new reflink data; allocating a new address for the new reflink data in the disk, and mapping a cache address of the new reflink data to the new address, so as to store the new reflink data to the new address according to a file open mode of the modification request, and reducing a reference count of the reflink data in a reflink shared tree by one.

It can be seen that when modifying the reflink data, in the present application, first reading continuous data including currently modified data from a disk to a cache, then modifying corresponding reflink data in the cache based on the current modification request, but not modifying other data in the continuous data, and then allocating a new address for the new reflink data obtained by being modified in the disk, and mapping the cache address of the new reflink data to the new address, so as to store the new reflink data in the new address of the disk, and at the same time reducing the reference count of the corresponding reflink data in the reflink shared tree by one, so as to indicate that there is one less sharer of the reflink data. In this solution, there is only one read operation and one write operation for the disk, it can be seen that one write operation is reduced, so the problem of write amplification is reduced; at the same time, the solution caches other data while caching the currently modified data, i.e., a pre-read mechanism is introduced, and subsequent access operations for other data in the continuous data may directly hit the cache, so that frequent reading of the disk may be avoided, and thus the efficiency of subsequent operations may be improved.

Accordingly, the request processing apparatus, the device, and the non-transitory readable storage medium provided in the present application also have the above-mentioned technical effect.

BRIEF DESCRIPTION OF THE DRAWINGS

In order to provide a clearer explanation of the embodiments or technical solutions in the present application or prior art, a brief introduction will be made to the accompanying drawings required in the description of the embodiments or prior art. It is evident that the accompanying drawings in the following description are only embodiments of the present application. For those skilled in the art, other accompanying drawings can be obtained based on the provided drawings without creative labor.

DETAILED DESCRIPTION

The following will provide a clear and complete description of the technical solution in the embodiments of the present application, in conjunction with the accompanying drawings. Obviously, the described embodiments are only a part of the embodiments of the present application, not all of them. Based on the embodiments in the present application, all other embodiments obtained by persons skilled in the art without creative labor fall within the scope of protection of the present application.

Currently, write amplification problems exist when data shared via reflink is modified. To this end, the present application provides a request processing solution capable of reducing a write disk operation when reflink data is modified, reducing a write amplification problem, and at the same time improving the efficiency of subsequent operations.

Figure 1:
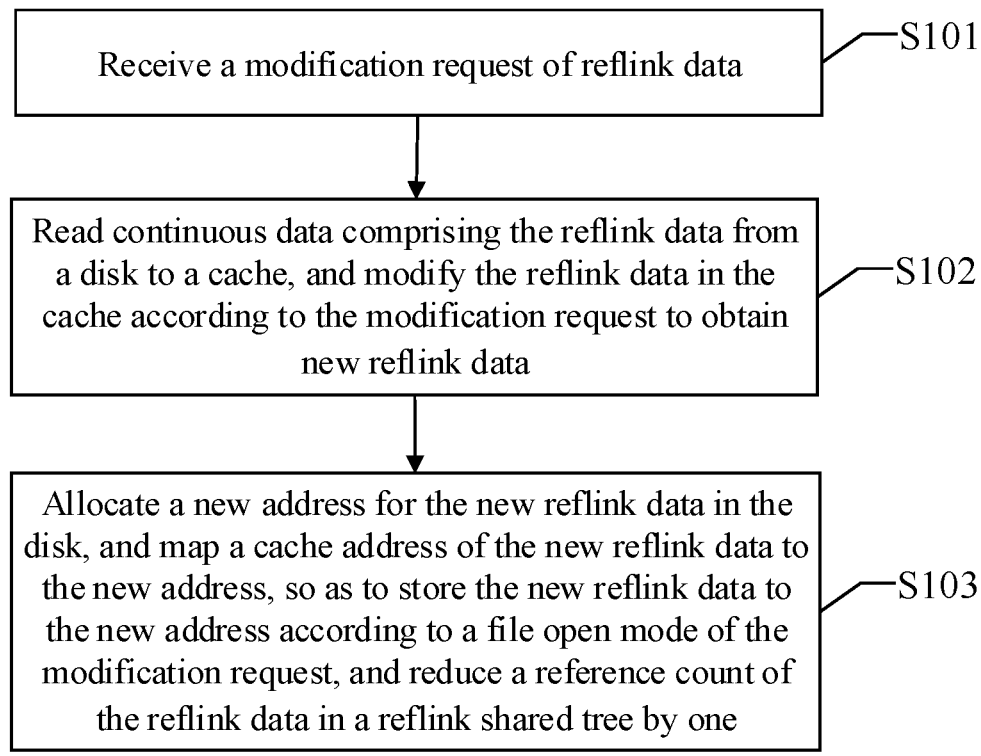
FIG. 1 is a flow chart of a request processing method in some embodiments of the present application.

Referring to FIG. 1, the embodiment of the present application discloses a request processing method, including:

S101, receiving a modification request of reflink data.

It should be noted that the reflink data refers to data shared by at least two sharers based on reflink technology. The sharer may be a virtual machine, a file, a node, a device, etc. For the reflink data, only when the shared data is modified, the file system underlying layer will allocate new space to copy the source data to the new location, and then write the user-modified data. As can be seen, reflink delays the allocation of space with the actual copying of data until the data is modified, thus improving disk space utilization and data copying speed. Compared with Hardlink, reflink provides inter-file data sharing with data segment granularity, with higher flexibility and disk space utilization, and Btrfs, xfs, ext4, ocfs2, and other file systems support reflink.

Certainly, the shared reflink data has a corresponding reflink shared tree (namely, refcount tree) to record the contents of the shared data, the number of sharers, etc. In some embodiments, each node in the reflink shared tree corresponds to a shared datum, and the datum is associated with a reference count, the value of the reference count recording how many sharers the datum is shared. Data shared by multiple sharers actually corresponds to only one disk address. That is: when reflink copying is performed on a file, the file system only allocates original data for the object file, does not allocate a real disk space, and does not perform a real data copy; at this time, the source file and the object file share a data area of the file, but actually the part of data shared by the source file and the object file corresponds to the same disk address.

When any sharer X modifies the data A shared with the other sharers, the sharer X will exclusively enjoy the modified data A', and no longer share the data A with the other sharers, but the other sharers (when the number of the other sharers is greater than 1) may continue to share the data A. That is: when the reference count is decremented by one, the corresponding new data A' needs to be stored in a new location. When the reference count is equal to 1, indicating that A has only one sharer, then A can be deleted directly from the corresponding node in the reflink shared tree.

Certainly, there are at least two indexes corresponding to each node in the reflink shared tree. Any index is: a directional relationship of any sharer of a node and the node is configured to determine the data on the node is shared by which sharer. Thus, when sharer X no longer shares data A with the other sharers, the index corresponding to sharer X on the node where data A is located may be deleted, so that sharer X no longer points to data A.

In an embodiment, after reducing a reference count of the reflink data in a reflink shared tree by one, the method further includes: when the reference count after reducing by one is equal to one, deleting the node where the reflink data is located from the reflink shared tree. Certainly, the corresponding index and reference count are deleted.

S102, reading continuous data including the reflink data from a disk to a cache, and modifying the reflink data in the cache according to the modification request to obtain new reflink data.

In an embodiment, reading continuous data including the reflink data from a disk to a cache includes: reading continuous data including the reflink data from disk to the cache on the basis of locality principles, so that pre-reading data larger than the current reflink data for subsequent other operations to directly hit the cache. The continuous data is typically a data block of 1 M in size, while the reflink data modified by a modification request is typically one page in size. That is: data is typically read or written in units of page.

In an embodiment, storing the new reflink data to the new address according to a file open mode of the modification request includes: determining the file open mode according to a mode flag bit in the modification request; when the file open mode is a direct mode, returning a notification message that processing is completed after storing the new reflink data to the new address. Requirements for direct mode: the modified data is flushed, and then a response notification message is returned.

In an embodiment, storing the new reflink data to the new address according to a file open mode of the modification request includes: determining the file open mode according to a mode flag bit in the modification request; when the file open mode is a non-direct mode, returning a notification message that processing is completed, and marking the new reflink data as dirty data, so as to store the new reflink data marked as the dirty data to the new address according to a preset flush mechanism. Among them, the preset flush mechanism includes: a periodicity mechanism, a memory reclamation mechanism, and/or a user enforcement mechanism. Requirements for non-direct mode: after the data is modified in the cache, a response notification message is directly returned without waiting for the data flush, and a subsequent system would flush the modified data according to a preset flush mechanism thereof.

S103, allocating a new address for the new reflink data in the disk, and mapping a cache address of the new reflink data to the new address, so as to store the new reflink data to the new address according to a file open mode of the modification request, and reducing a reference count of the reflink data in a reflink shared tree by one.

It needs to be stated that mapping the cache address of the new reflink data to the new address is equivalent to changing an original mapping relationship between the cache address and a disk address. In some embodiments: after continuous data including reflink data is read from a disk to a cache, a mapping relationship exists between a cache address occupied by the reflink data in the cache and an address of the reflink data in the disk, and this embodiment is mandatory to modify the mapping relationship as: the mapping relationship between the cache address of the new reflink data obtained by being modified the reflink data and the new address of the disk, which is equivalent to using the same cache address twice (the cache address occupied by the reflink data in the cache is the cache address of the new reflink data), and therefore, it is not necessary to write the reflink data into the new address of the disk and then modify same.

However, in the prior art, since the mapping relationship between the cache address and the disk address is not modified, the data in the cache can only be written into the new address of the disk first, so that the new address of the disk has a new mapping relationship with the cache, data in the cache is modified, the data is stored to the new address of the disk according to the mapping relationship.

It can be seen that the prior art needs to use the write operation once to make that there is a mapping relationship between a new address of a disk and a cache address, while the present embodiment does not need to use a write operation to establish the mapping relationship, but directly completes the establishment of the mapping relationship in code logic, thus omitting the write operation once and reducing the problem of write amplification.

In an embodiment, when an access request for other data in the continuous data is received, responding to the access request based on the other data in the cache.

In an embodiment, mapping a cache address of the new reflink data to the new address includes: invoking a cache interface to release a mapping relationship between the cache address and an original address of the reflink data in the disk, and establishing a mapping relationship between the cache address and the new address. Wherein a specific cache address can be located based on the cache interface, and therefore a mapping relationship between the cache address and a disk address can be modified.

It can be seen that when modifying the reflink data, in the embodiment, first reading the continuous data including currently modified data from a disk to a cache, then modifying corresponding reflink data in the cache based on the current modification request, but not modifying other data in the continuous data, and then allocating a new address for the new reflink data obtained by being modified in the disk, and mapping the cache address of the new reflink data to the new address, so as to store the new reflink data obtained by being modified in the new address of the disk, and at the same time reducing the reference count of the corresponding reflink data in the reflink shared tree by one, so as to indicate that there is one less sharer of the reflink data. In this solution, there is only one read operation and one write operation for the disk, it can be seen that one write operation is reduced, so the problem of write amplification is reduced; at the same time, the solution caches other data while caching the currently modified data, i.e., a pre-read mechanism is introduced, and subsequent access operations for the other data in the continuous data may directly hit the cache, so that frequent reading of the disk may be avoided, and thus the efficiency of subsequent operations may be improved.

Figure 2:
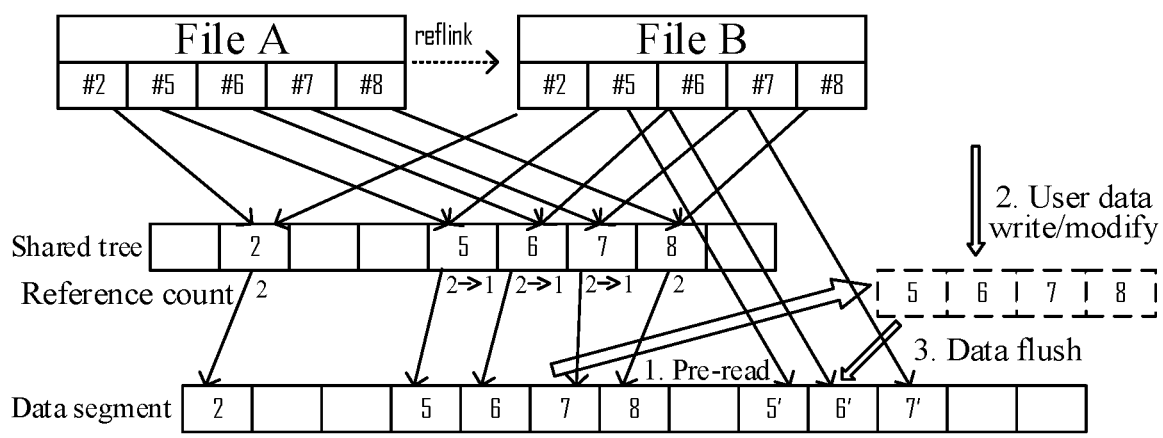
FIG. 2 is a schematic diagram of another request processing flow in some embodiments of the present application.

Referring to FIG. 2, a file A and a file B share data 2, 5, 6, 7, and 8, with a shared tree (i.e. refcount tree). Whether the file A or the file B is read, the same data segment is pointed to last through the relevant index lookup, and then through the refcount tree.

Taking FIG. 2 as an example, the data modification flow provided by the present embodiment includes: when modifying 5, at first, 5, 6, 7, and 8 are pre-read into the cache, a length of the pre-read data is determined by the pre-reading algorithm, and is much larger than one page, and the pre-read IO is a continuous IO (e.g. one data block). Secondly, a distinction is made according to whether the program open file mode is O_DIRECT: when it is a direct mode, then directly modifying 5 in the cache, and forcing the modified data to flush; when it is a non-direct mode, the modified 5 in the cache is marked as dirty, and the modified 5 is then flushed by the system. The cache swiping strategy of the system includes: periodically brush down, to threshold brush down (memory reclamation mechanism triggered when the memory is insufficient), and user forcing brush down (invoking sync). The instants of the brushing down are all later than the instants of the data IO.

Since all the data segments 5, 6, and 7 are pre-read into the cache, when the user has finished modifying the data segment 5, the data segments 6 and 7 are already in the cache, and therefore it is not necessary to read the disk again during the subsequent modification of the data segments 6 and 7 but to directly modify the data segments 6 and 7 in the cache.

Here, the data 8 is not modified, but it is still read into the cache. This is determined by the pre-read mechanism, whose overhead is acceptable and can be explained by the locality principle.

As shown in FIG. 2, the modified 5, 6, 7 is changed to 5', 6', 7' and stored to the new disk location. The pre-read data 5, 6, 7 to the cache (5, 6, 7 in the dotted box) is modified first, and then the modified data is directly mapped to a new location, and this flow and the prior art can complete a data modification operation, but omitting a data write. The reference counts of the respective 5, 6, and 7 are also updated accordingly.

This embodiment may effectively improve reflink file writing efficiency by writing reflink data based on a pre-read mechanism. In some embodiments, a pre-read mechanism is introduced in the reflink file data writing stage, which pre-locates a large piece of continuous data in the cache according to the locality principle of the computer, without reading from page to page. Second, distinguishing is performed according to whether the user program open file mode is O_DIRECT: when it is a direct mode, the user data directly modifies the cache and forces it to flush; when it is a non-direct mode, the user data directly modifies the pre-read cache and marks it as dirty, which is then flushed by the system. This solution makes the original data write flow change from one disk read and two writes to one read and one write, and the data read is pre-read of large block IO, so the data write performance is greatly improved, and the first-time write performance of reflink file may approach the performance of normal file write.

It can be seen that the present embodiment introduces a pre-read mechanism in the reflink data writing stage, namely, when a user writes data, a large segment of continuous data is pre-read based on the pre-read mechanism provided by Linux. According to the locality principle of computers, the high probability of data writing is the continuous address range and will be greater than one page, so that the subsequent data is pre-cached without reading the disk page by page, so the first-time writing performance of the reflink file may be significantly improved. This embodiment may improve the performance of virtual machine cloning and snapshot solution based on reflink implementation, and may effectively improve the speed of virtual machine cloning and snapshot in the virtualization scenario, at the same time making the virtual disk of the virtual machine have good read-write performance, and improve the performance and competitiveness of virtualization products.

A request processing apparatus according to an embodiment of the present application is described below, and a request processing apparatus described below and a request processing method described above can be referred to each other.

Figure 3:
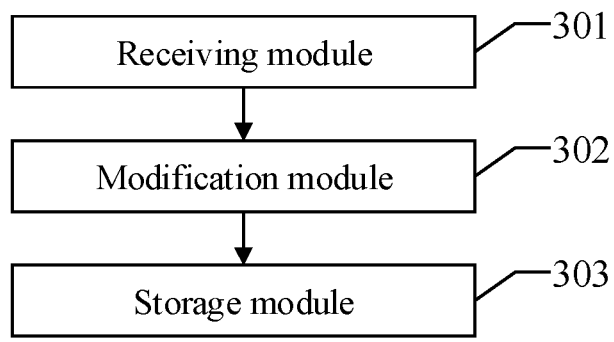
FIG. 3 is a schematic diagram of a request processing apparatus in some embodiments of the present application.

Referring to FIG. 3, the embodiment of the present application discloses a request processing apparatus, including:

a receiving module 301, for receiving a modification request of reflink data;

a modification module 302, for reading continuous data including the reflink data from a disk to a cache, and modifying the reflink data in the cache according to the modification request to obtain new reflink data; and a storage module 303, for allocating a new address for the new reflink data in the disk, and mapping a cache address of the new reflink data to the new address, so as to store the new reflink data to the new address according to a file open mode of the modification request, and reducing a reference count of the reflink data in a reflink shared tree by one.

In an embodiment, the modification module is specifically for:

reading continuous data including the reflink data from disk to the cache on the basis of locality principles.

In an embodiment, the storage module includes:

a determination unit for determining the file open mode according to a mode flag bit in the modification request;

a first storage unit for, when the file open mode is a direct mode, returning a notification message that processing is completed after storing the new reflink data to the new address.

In an embodiment, the storage module includes:

a determination unit for determining the file open mode according to a mode flag bit in the modification request;

a second storage unit for, when the file open mode is a non-direct mode, returning a notification message that processing is completed, and marking the new reflink data as dirty data, so as to store the new reflink data to the new address according to a preset flush mechanism.

In an embodiment, the preset flush mechanism includes a periodicity mechanism, a memory reclamation mechanism, and/or a user enforcement mechanism.

In an embodiment, further including:

a deletion module for, when the reference count after reducing by one is equal to one, deleting the node where the reflink data is located from the reflink shared tree.

In an embodiment, further including:

a response module for, when an access request for other data in the continuous data is received, responding to the access request based on the other data in the cache.

In an embodiment, the storage module is specifically for:

invoking a cache interface to release a mapping relationship between the cache address and an original address of the reflink data in the disk, and establishing a mapping relationship between the cache address and the new address.

Here, with regard to the operation of each module and unit in the present embodiment, reference can be made to the corresponding contents disclosed in the foregoing embodiments, and the description thereof will not be repeated.

It can be seen that the present embodiment provides a request processing apparatus capable of reducing a write disk operation when reflink data is modified, reducing a write amplification problem, and at the same time improving the efficiency of subsequent operations.

An electronic device provided by an embodiment of the present application is described below, and the electronic device described below and the request processing method and apparatus described above can be referred to each other.

Figure 4:
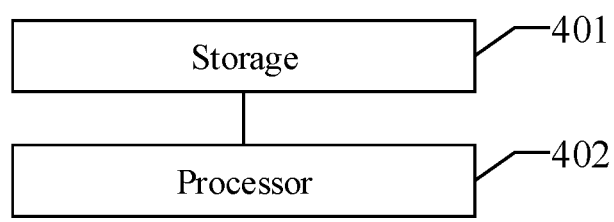
FIG. 4 is a schematic diagram of an electronic device in some embodiments of the present application.

Referring to FIG. 4, the embodiment of the present application discloses an electronic device, including:

a storage 401 for storing a computer program;

a processor 402 for executing a computer program to implement the method disclosed in any of the embodiments described above.

A non-transitory readable storage medium provided by an embodiment of the present application is described below, and a non-transitory readable storage medium described below and a request processing method, apparatus, and device described above can be referred to each other.

A non-transitory readable storage medium storing a computer program, wherein the computer program, when executed by a processor, implements the request processing method disclosed in the foregoing embodiments. With regard to the specific steps of the method, reference can be made to the corresponding disclosure in the foregoing embodiments, which will not be described in detail herein.

Each of devices according to the embodiments of the present application can be implemented by hardware, or implemented by software modules operating on one or more processors, or implemented by the combination thereof. A person skilled in the art should understand that, in practice, a microprocessor or a digital signal processor (DSP) may be used to realize some or all of the functions of some or all of the modules in the device according to the embodiments of the present application. The present application may further be implemented as device program (for example, computer program and computer program product) for executing some or all of the methods as described herein. Such program for implementing the present application may be stored in the computer readable medium, or have a form of one or more signals. Such a signal may be downloaded from the internet websites, or be provided in carrier, or be provided in other manners.

Figure 5:
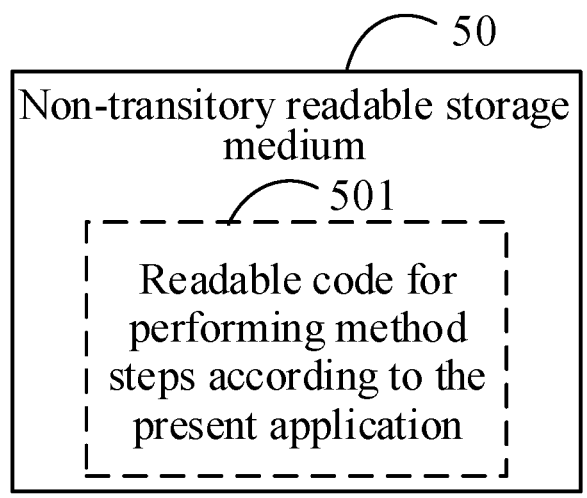
FIG. 5 schematically shows a non-transitory readable storage medium for holding or carrying program code for implementing the method according to the present application.

For example, traditionally, the electronic device includes a processor and a computer program product or a computer readable medium in form of a memory. The memory could be electronic memories such as flash memory, EEPROM (Electrically Erasable Programmable Read-Only Memory), EPROM, hard disk or ROM. The memory has a memory space for executing program codes of any steps in the above methods. For example, the memory space for program codes may include respective program codes for implementing the respective steps in the method as mentioned above. These program codes may be read from and/or be written into one or more computer program products. These computer program products include program code carriers such as hard disk, compact disk (CD), memory card or floppy disk. These computer program products are usually non-transitory readable storage medium 50 as shown in FIG. 5. The non-transitory readable storage medium 50 may be provided with memory sections, memory spaces, etc., similar to the memory of the sub-device. The program codes may be compressed for example in an appropriate form. Usually, the non-transitory readable storage medium includes computer readable codes 501 which can be read for example by processors. When these codes are operated on the electronic device, the electronic device may execute respective steps in the method as described above.

The terms "first", "second", "third", "fourth", etc. (if any) referred to in the present application are used to distinguish similar objects and do not need to be used to describe a specific order or sequence. It should be understood that the data used in this way can be interchanged in appropriate cases, so that the embodiments described here can be implemented in order other than those illustrated or described here. In addition, the terms "including" and "having" and any variations thereof are intended to cover non-exclusive inclusion, for example, a process, method, or device that includes a series of steps or units does not need to be limited to those steps or units clearly listed, but may include other steps or units that are not clearly listed or inherent to these processes, methods, or devices.

It should be noted that the descriptions related to "first", "second", etc. in the present application are only for descriptive purposes and cannot be understood as indicating or implying their relative importance or implying the quantity of technical features indicated. Therefore, the features limited to "first" and "second" can explicitly or implicitly include at least one of these features. In addition, the technical solutions between various embodiments can be combined with each other, but must be based on what persons skilled in the art can achieve. When the combination of technical solutions conflicts or cannot be achieved, it should be considered that the combination of such technical solutions does not exist and is not within the scope of protection required by the present application.

The various embodiments in the specification are described in a progressive manner, and each embodiment focuses on the differences from other embodiments. The same or similar parts between each embodiment can be referred to each other.

The steps of the method or algorithm described in conjunction with the disclosed embodiments in the specification can be directly implemented using hardware, software modules executed by processors, or a combination of both. Software modules can be placed in random access memory (RAM), memory, read-only memory (ROM), electrically programmable ROM, electrically erasable programmable ROM, registers, hard drives, removable disks, CD-ROM, or any other form of non-transitory readable storage medium known in the art.

This specification applies specific examples to explain the principles and implementation methods of the present application. The above examples are only used to help understand the methods and core ideas of the present application. Meanwhile, for general technical personnel in this field, there may be changes in specific implementation methods and application scope based on the ideas of the present application. Therefore, the content of this specification should not be understood as a limitation on the present application.

The invention claimed is:

1. A request processing method, comprising:
    receiving a modification request of reflink data;
    reading continuous data comprising the reflink data from a disk to a cache, and modifying the reflink data in the cache according to the modification request to obtain new reflink data; and
    allocating a new address for the new reflink data in the disk, and mapping a cache address of the new reflink data to the new address, so as to store the new reflink data to the new address according to a file open mode of the modification request, and reducing a reference count of the reflink data in a reflink shared tree by one.

2. The request processing method according to claim 1, wherein reading continuous data comprising the reflink data from a disk to a cache comprises:
    reading continuous data comprising the reflink data from the disk to the cache on the basis of locality principles.

3. The request processing method according to claim 1, wherein store the new reflink data to the new address according to a file open mode of the modification request comprises:
    determining the file open mode according to a mode flag bit in the modification request;

when the file open mode is a direct mode, returning a notification message that processing is completed after storing the new reflink data to the new address.

4. The request processing method according to claim 1, wherein store the new reflink data to the new address according to a file open mode of the modification request comprises:
determining the file open mode according to a mode flag bit in the modification request;
when the file open mode is a non-direct mode, returning a notification message that processing is completed, and marking the new reflink data as dirty data, so as to store the new reflink data to the new address according to a preset flush mechanism.

5. The request processing method according to claim 4, wherein the preset flush mechanism comprises: a periodicity mechanism, a memory reclamation mechanism, and/or a user enforcement mechanism.

6. The request processing method according to claim 5, wherein when the preset flush mechanism is the memory reclamation mechanism, store the new reflink data to the new address according to a preset flush mechanism comprises:
when a memory reaches a threshold, storing the new reflink data at the new address.

7. The request processing method according to claim 1, wherein after reducing a reference count of the reflink data in a reflink shared tree by one, the request processing method further comprises:
when the reference count after reducing by one is equal to one, deleting a node where the reflink data is located from the reflink shared tree.

8. The request processing method according to claim 1, wherein after reducing a reference count of the reflink data in a reflink shared tree by one, the method further comprises:
when the reference count after reducing by one is equal to one, deleting an index and a reference count corresponding to a node where the reflink data is located.

9. The request processing method according to claim 1, wherein the reflink data is data shared by at least two sharers; and the reference count of the reflink data is configured to characterize a quantity of the sharers of the reflink data.

10. The request processing method according to claim 1, wherein after modifying the reflink data in the cache according to the modification request, the method further comprises:
deleting an index in the index corresponding to the node where the reflink data is located for characterizing a pointing relationship between a target sharer and the node, wherein the target sharer is a sharer requesting to modify the reflink data.

11. The request processing method according to claim 1, wherein the cache address occupied by the new reflink data in the cache is the same as a cache address occupied by the reflink data in the cache.

12. The request processing method according to claim 1, wherein a size of the continuous data is larger than a size of the reflink data.

13. The request processing method according to claim 1, wherein a data length of the continuous data is determined according to a pre-reading algorithm, and the data length of the continuous data is in units of data blocks.

14. The request processing method according to claim 1, further comprising:
when an access request for other data in the continuous data is received, responding to the access request based on the other data in the cache.

15. The request processing method according to claim 1, further comprising:
when a modification request of other data in the continuous data is received, directly modifying the other data in the cache.

16. The request processing method according to claim 1, wherein mapping a cache address of the new reflink data to the new address comprises:
invoking a cache interface to release a mapping relationship between the cache address and an original address of the reflink data in the disk, and establishing a mapping relationship between the cache address and the new address.

17. The request processing method according to claim 16, wherein the cache interface is configured to locate the cache address of the new reflink data.

18. The request processing method according to claim 1, wherein at least two indexes correspond to each node in the reflink shared tree, and any index of the at least two indexes is: a directional relationship of any sharer of a node and the node is configured to determine data on the node is shared by which sharer.

19. An electronic device, comprising:
a storage, for storing a computer program;
a processor, for executing the computer program to implement the request processing method according to claim 1.

20. A non-transitory readable storage medium, for storing a computer program, wherein the computer program, when executed by a processor, implements the request processing method according to claim 1.

* * * * *